UNITED STATES PATENT OFFICE 2,146,693

DRILLING MUDS

William V. Vietti and Allen D. Garrison, Houston, Tex., assignors to The Texas Company, New York, N. Y., a corporation of Delaware No Drawing. Application December 8, 1936, Serial No. 114,764

7 Claims. (Cl. 255—1)

This invention relates to drilling muds and particularly to the type of drilling muds containing substantial amounts of sodium silicate solutions. The invention contemplates the use of bentonite or bentonitic clays as weighting materials in such muds.

Drilling muds are almost universally used in the drilling of wells employed for tapping underground collections of oil, gas, brines and water. These muds fulfill various functions, the most important of which are to assist in the removal of cuttings from the wells, to seal formations of gas, oil and water which may be encountered at various levels, and to lubricate the drilling tools and the drill pipes which carry the tools.

These drilling muds in their simplest form consist of suspensions of clay in water. In those cases where the drilling mud is used for drilling gas formations, it is necessary that the hydrostatic pressure of the drilling mud more than counterbalance the gas pressure in the formation. In such cases it is customary to increase the weight per volume of the drilling mud by the addition thereto of materials having a high specific gravity, such as barytes, iron oxide or finely divided non-colloidal solids. Natural clays are usually not suitable for this purpose since they consist of mixtures of gel-forming particles and non-gel-forming particles, and the addition therefore of such natural clays means the introduction into the drilling mud of colloidal gel-forming particles which may excessively increase the gel strength and viscosity of the drilling mud.

In our co-pending application Serial No. 46,893, filed October 26, 1935, we have disclosed the preparation and use of drilling muds containing substantial quantities of commercial sodium silicate solutions (water glass), such drilling muds being especially adapted to the penetration of heaving shale strata. We have also disclosed in another co-pending application, Serial No. 94,586, filed August 6, 1936, that such drilling muds may also be prepared to contain substantial amounts of certain water-soluble inorganic salts together with the sodium silicate solutions. We have discovered that bentonite or bentonitic clays may be added in a dry state to these sodium silicate type drilling muds, and when so added they serve as weighting materials. Bentonites treated in accordance with our invention have specific gravities in the neighborhood of 2.5, usually varying from about 2.4 to about 2.6. We intend that the term "bentonite" as used in the specification and claims include bentonite, clays containing appreciable quantities of bentonite, as well as those clays which display the property of deflocculating in water. Although we are not certain of the reactions that take place, we believe that the sodium silicate represses the peptizing of the bentonite and that the bentonite particles become filmed over or impregnated with silica gel, and are thereby prevented from being converted into colloidal particles. We believe that the reason for this is that bentonites display a buffer action, since they tend to maintain the pH value of the aqueous medium in which they are placed at a pH value of from 7 to 9. Sodium silicate solutions have pH values in the neighborhood of 11. Therefore, when the dry bentonite is placed in the solution of sodium silicate, the bentonite, because of its buffering action, reduces the pH value of the sodium silicate solution with the result that silica gel is precipitated. Silica gel being deposited upon and in the particles of bentonite prevents the peptizing of the bentonite and prevents its becoming colloidally dispersed. It should be understood, however, that we do not desire to be limited by the foregoing theoretical explanation of our invention.

The sodium silicates which we propose to use in the practice of our invention are the commercially available water solutions of sodium silicate. They are placed on the market in water solutions at concentrations near the practical limit of viscosity for the purpose of avoiding the expense of shipping unnecessary amounts of water. It is well known that these commercial sodium silicate solutions range in water content from about 35% for sodium silicates having a molecular ratio of 1.5:1 up to about 70% for the sodium silicates having molecular ratios of 3.9:1. We appreciate that commercial sodium silicates are prepared by dissolving in water sodium silicates which are sometimes spoken of in the art as "sodium silicate glass". In the practice of our invention we contemplate the use of commercial sodium silicate solutions without regard to their method of preparation.

In the practice of our invention we use sodium silicates in which the molecular ratio of silica to sodium oxide is greater than 1 and, preferably, sodium silicates in which the ratio of silica to sodium oxide falls within the range of from 1.1:1 up to 3.9:1. Our invention may be practiced by using solutions of sodium silicate consisting essentially of sodium silicate and water or dispersions of finely divided solids in aqueous solutions of sodium silicate. We have disclosed in our co-pending application Serial No. 94,586, filed August 6, 1936, that drilling muds adapted for drilling heaving shale containing sodium silicates will more effectively perform their functions if there are added to the sodium silicate solutions certain inorganic salts, namely, the sodium and potassium thiocyanates, chlorates, iodides, nitrates, bromides, chromates and chlorides. In dispersions containing these salts we contemplate the use of a quantity of salt ranging in amount from about 2% by weight of the aqueous medium up to the saturation point of a dissolved constituent. In accordance with the present invention, bentonites may be used as weighting materials in any of the sodium silicate type muds referred to above.

We have found that drilling muds containing from about 20% to 70% by volume of commercial sodium silicate solutions may satisfactorily be weighted by the addition of dry, pulverulent bentonite. We are aware of the use of bentonite as a colloidal dispersing agent where the addition of weighting materials, such as barytes, is desired in drilling muds; in so using bentonite, it is dispersed in water to make a drilling mud of the desired viscosity and other characteristics. As opposed to this practice, we propose to add the bentonite in dry, pulverulent form to the sodium silicate type drilling mud, whereby the bentonite serves as a weighting material and does not become colloidally dispersed as in the prior art practice. We do not intend to limit ourselves to the use of any particular quantity of bentonite and, although we contemplate the use of as much as 10% by weight of the dry material, we may employ both larger and smaller quantities.

We give herewith several examples which illustrate the practice of our invention. In these examples there were employed a natural California bentonite which yielded a pH value of 9.2 in water suspension and a commercially available barium sulfate such as is generally used as a weighting material in the preparation of weighted drilling muds.

Example 1

Four grams of bentonite were dispersed in water. To this dispersion there were added 25 grams of barium sulfate. Sufficient water was added to bring the volume of the suspension to 80 cubic centimeters. To the suspension there was then added 20 cubic centimeters of a sodium silicate in which the molecular ratio of silica to sodium oxide was about 2:1. When tested with a Stormer viscosimeter the suspension was found to have a viscosity corresponding to 24 centipoises.

Example 2

Another suspension was prepared containing the same quantities of ingredients as the suspension shown in Example 1. However, instead of dispersing the bentonite in water the dry bentonite was added directly to the sodium silicate suspension of barium sulfate. This suspension was found to have a viscosity corresponding to 2.5 centipoises by the Stormer viscosimeter.

Example 3

To a drilling mud comprising clay, barytes, and 50% by volume of a sodium silicate in which the molecular ratio of silica to sodium oxide was about 2:1, there was added approximately 1.39% by weight of bentonite. This drilling mud had a viscosity of 51 centipoises by the Stormer viscosimeter.

Example 4

A drilling mud containing the same quantities of constituents as the mud shown in Example 3 was used in this example. However, instead of adding the bentonite to the suspension of barytes, clay and sodium silicate solution the bentonite was originally dispersed in water so as to permit it to become deflocculated. This mud had a viscosity of 101 centipoises when tested in a Stormer viscosimeter.

Example 5

A drilling mud containing barytes, clay, water, dispersed bentonite, sodium chloride, potassium chloride, and sodium silicate was prepared by dispersing 0.72% by weight of bentonite in water and adding the dispersion to a drilling mud comprising clay, barytes, sodium chloride, potassium chloride and about 33% by volume of a sodium silicate in which the molecular ratio of silica to sodium oxide was about 2:1. This drilling mud had a viscosity of approximately 21 centipoises by the Stormer viscosimeter.

Example 6

A drilling mud was prepared containing the same quantities of ingredients as in Example 5 with the exception that the bentonite was added last and in a dry form. It was found that in order to obtain a viscosity of 21 centipoises it was necessary to add 18 times as much bentonite as in the case of Example 5 where the bentonite had been first dispersed in water.

The above examples clearly indicate that when bentonite is added in dry form to a solution of sodium silicate or a suspension of which the aqueous phase contains sodium silicate that the bentonite serves as a weighting material and not as a colloidal suspending agent.

Obviously many modifications and variations of the invention as hereinbefore set forth may be made without departing from the spirit and scope thereof and only such limitations should be imposed as are indicated in the appended claims.

We claim:

1. A drilling mud comprising bentonite in substantially undispersed state and 20% or more by volume of sodium silicate in which the molecular ratio of silica to sodium oxide is greater than 1.

2. A drilling mud comprising bentonite in substantialy undispersed state and from 20 to 70% of sodium silicate in which the molecular ratio of silica to sodium oxide is greater than 1.

3. A drilling mud comprising 20 to 70% of sodium silicate in which the molecular ratio of silica to sodium oxide is greater than 1 and to which has been added dry, pulverulent bentonite.

4. In the art of drilling wells, the method comprising introducing into the well a drilling mud containing 20% or more by volume of sodium silicate in which the molecular ratio of silica to sodium oxide is greater than 1, and controlling the density of said mud by the addition of dry, pulverulent bentonite.

5. A drilling mud comprising bentonite in substantially undispersed state, sodium silicate in which the molecular ratio of silica to sodium oxide is greater than 1, and at least one salt selected from the group consisting of the sodium and potassium thiocyanates, chlorates, iodides, nitrates, bromides, chromates and chlorides, the salt content of the dispersion falling within the range of from 2% by weight of the aqueous medium up to the saturation value of a dissolved component.

6. A drilling mud comprising bentonite in substantially undispersed state, from 20 to 70% of sodium silicate in which the molecular ratio of silica to sodium oxide is greater than 1, and at least one salt selected from the group consisting of the sodium and potassium thiocyanates, chlorates, iodides, nitrates, bromides, chromates and chlorides, the salt content of the dispersion falling within the range of from 2% by weight of the aqueous medium up to the saturation value of a dissolved component.

7. In the art of drilling wells the method comprising introducing into the well a drilling mud containing 20% or more by volume of sodium silicate in which the molecular ratio of silica to sodium oxide is greater than 1, at least one salt selected from the group consisting of the sodium and potassium thiocyanates, chlorates, iodides, nitrates, bromides, chromates and chlorides, the salt content of the dispersion falling within the range of from 2% by weight of the aqueous medium up to the saturation value of a dissolved component, and controlling the density of said mud by the addition of dry pulverulent bentonite.

WILLIAM V. VIETTI.
ALLEN D. GARRISON.